United States Patent [19]
Lin

[11] Patent Number: 5,808,588
[45] Date of Patent: Sep. 15, 1998

[54] SHUTTER SYNCHRONIZATION CIRCUIT FOR STEREOSCOPIC SYSTEMS

[75] Inventor: Ming-Yen Lin, Taipei, Taiwan

[73] Assignee: Artificial Parallax Electronics Corp., Taipei, Taiwan

[21] Appl. No.: 637,556

[22] Filed: Apr. 25, 1996

[51] Int. Cl.⁶ .................................................. G09G 5/00
[52] U.S. Cl. ................................. 345/6; 345/8; 348/56
[58] Field of Search ................................. 348/56, 51, 53, 348/54, 55; 345/7, 4, 6, 87, 302, 419, 8

[56] References Cited

U.S. PATENT DOCUMENTS

| | | | |
|---|---|---|---|
| 4,424,529 | 1/1984 | Roese et al. ........................ | 348/56 |
| 4,870,600 | 9/1989 | Hiraoka ............................... | 348/56 |
| 4,979,033 | 12/1990 | Stephens ............................ | 348/56 |
| 5,654,749 | 8/1997 | Kanno ................................ | 348/56 |

*Primary Examiner*—Dennis-Doon Chow
*Attorney, Agent, or Firm*—W. Wayne Liauh

[57] ABSTRACT

A shutter synchronization circuit for a stereoscopic system, which comprises a CPU, a main memory, a VGA graphic card, a monitor, a RS 232 interface circuit, an interrupt controller, a timer and an external shutter synchronizer with RS 232 interface; the circuit is to be used in personal computers; by using the RS 232 interface and the external shutter synchronizer with RS 232 interface, the switching of the LCD shutter and the vertical synchronization scanning signal of the VGA graphic card can be in synchronization. By using a hardware system of a stereoscopic image, a user can see a stereoscopic scene instead of a plane image.

7 Claims, 6 Drawing Sheets

SHUTTER SYNCHRONIZATION CIRCUIT FOR STEREOSCOPIC SYSTEMS

BACKGROUND OF THE INVENTION

As a result of the highly developed technology and the multi-medium time approaching, the technique of three-dimensional stereoscopic system has been used gradually in personal computers; particularly, a stereoscopic display device has become one of the peripheral equipment of the personal computers because of stereoscopic image being widely used. Currently, a low cost and simple LCD shutter eye-glasses together with a hardware equipment can be emerged out of various types of stereoscopic image devices, and they can easily be accepted by the general consumers. To have a stereoscopic image, the basic theory therefor is that the LCD shutter switching of the LCD shutter eye-glasses for a user can be in synchronization with the vertical synchronization scanning signal of a VGA drawing card; such technique can be done by means of a shutter synchronization circuit; however, the circuit of the conventional technique is either too complicated because of using a lot of parts which will increase the manufacturing cost, or such circuit being built in the main frame of a computer, i.e., the main frame has to be disassembled before to install such circuit; therefore, the design and manufacture for such a shutter synchronization circuit of a stereoscopic system will cause a quite number of difficulties, which should be improved.

SUMMARY OF THE INVENTION

This invention relates to a shutter synchronization circuit for a stereoscopic system, and particularly to a simple circuit designed for obtaining a synchronization between the LCD shutter switching and the vertical synchronization scanning signal of a VGA drawing card.

The prime object of the present invention is to provide a shutter synchronization circuit by using a simple circuit to form into an external shutter synchronizer with RS 232 interface, and by combining a software program in a main memory, or a hardware device built in a main frame; the electronic circuit of the external shutter synchronizer with RS 232 interface can be furnished separately, or can be furnished in connectors of the RS 232 interface, or in some peripheral equipment, such as a mouse controller, a keyboard or a control rod so as to overcome the inconvenient and complicated problems usually existed in the conventional circuit of the kind, and also to have the LCD shutter switching of the LCD shutter eye-glasses become synchronized with the display of the left and right images.

Another object of the present invention is to provide a shutter synchronization circuit for a stereoscopic system, in which an interrupt controller is installed the main frame to receive a vertical synchronization interrupt signal out of a VGA drawing card; by using such signal, an interrupt request signal is sent to the main memory; by means of a software or a hardware device, the LCD shutter switching and the display of the left and right images can be in synchronization as desired.

Still another object of the present invention is to provide a shutter synchronization circuit for a stereoscopic system, in which the main frame is added with an interrupt controller and a timer; the timer is used for constantly generating a signal by means of approximate and synchronous to a vertical synchronization scanning signal of VGA drawing card, and the aforesaid signal is sent to the interrupt controller to generate an interrupt signal, which is then sent to the main memory; further, by using a software or a hardware device, the LCD shutter switching and the display of the left and right images can be synchronized such other.

DETAILED DESCRIPTION

Figure 1:
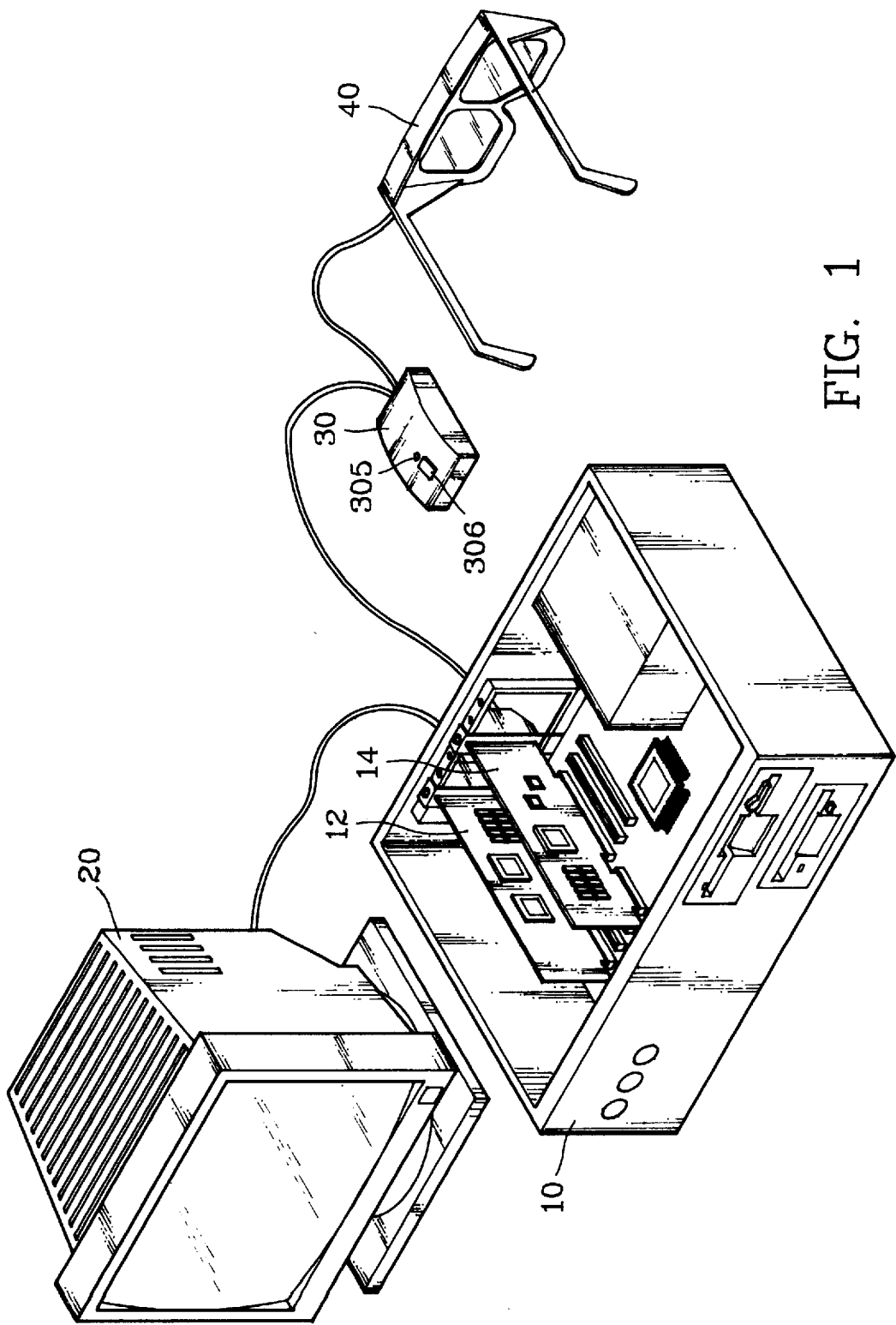
FIG. 1 is a perspective view of an embodiment according to the present invention.

Referring to FIG. 1, the embodiment of the present invention is shown with a perspective view, which comprises a main frame 10, a monitor 20, a VGA drawing card 12, a RS 232 interface circuit board 14, an external shutter synchronizer with RS 232 interface 30, and a wire-type LCD shutter eye-glasses 40. The main frame 10 together with the external shutter synchronizer with RS 232 interface 30 are used to enable the display time of the left picture and the right picture on the monitor 20 to be in synchronization with the LCD shutter switching of the wire-type LCD shutter eye-glasses 40 so as to provide a stereoscopic image for visual pleasure.

Figure 2:
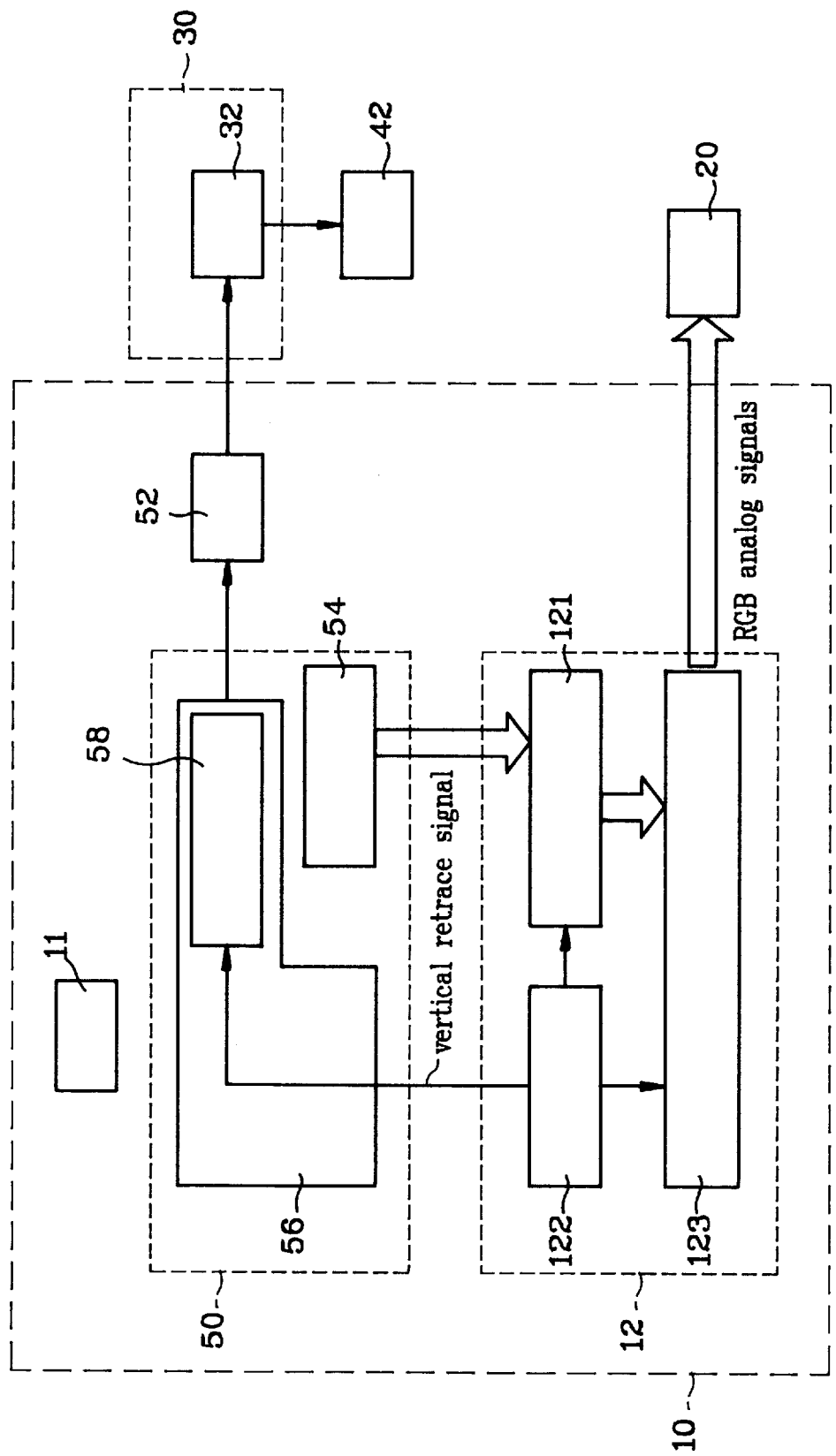
FIG. 2 is a block diagram of the embodiment-1 according to the present invention, showing the operation thereof.

Referring to FIG. 2, it is a block diagram of the embodiment-1 according to the present invention, showing the operation thereof, and it comprises a CPU 11, a main memory 50, a VGA drawing card 12, a monitor 20, an external shutter synchronizer with interface RS 232 30, a LCD shutter 42, and a RS 232 interface 52. First, CPU 11 will have the left and right image data sent, through the main memory 50, to a display memory 121 of the VGA drawing card 12; then, the controller 122 of the VGA drawing card 12 will have the data of the left and right images converted, by means of RAMDAC 123, into RGB analog signals, and these RGB analog signals are sent out into the monitor 20 alternatively; the monitor 20 will have the left and right images displayed on a screen respectively. In order to have the switching of the left and right LCD shutters 42 on the LCD shutter eye-glasses synchronized with the display time of the left and right images, the vertical retrace detecting program 58 of the application program 56 in the main memory 50 must first detect the vertical retrace condition (which is to be provided by the controller 122 of the VGA drawing card). If the scanning of the VGA drawing card 12 is under the vertical retrace condition, the vertical retrace detecting program 58 will send an output signal to the RS 232 interface 52; the RS 232 interface 52 will, through DTR or RTS pin, send out a shutter switching signal to the external shutter synchronizer with RS 232 interface 30; by using the aforesaid signal, the external shutter synchronizer with RS 232 interface 30 will actuate the LCD shutter driver 32, which will send out a LCD shutter driving signal to drive the LCD shutter 42 so as to have the switching of the LCD shutter in synchronization with the left and right image display time. Since synchronization between the switching of the LCD shutter 42 and the left and right image display are done by means of a software program, such method is referred to as a software type of synchronization.

Figure 3:
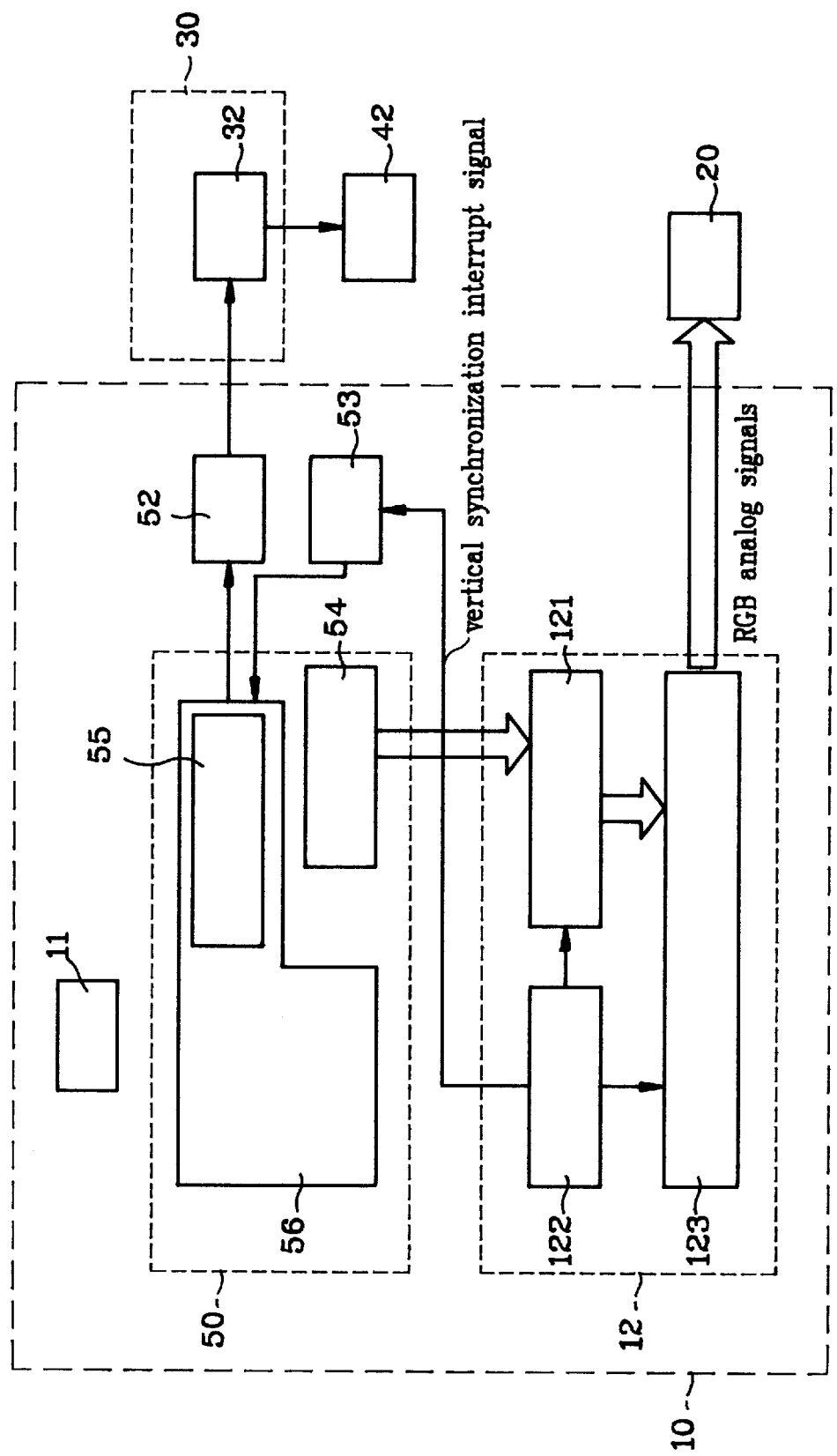
FIG. 3 is a block diagram of the embodiment-2 according to the present invention, showing the operation thereof.

Referring to FIG. 3, the embodiment-2 according to the present invention is shown with a block diagram, of which the difference from the embodiment-1 is that an interrupt controller 53 is added, and further a vertical synchronization interrupt program 55 is added to the application program 56. The transmission and display procedure of the left and right image data are the same as that of the embodiment-1, and therefore no description is given. First, the controller 122 of the VGA drawing card 12 sends out a vertical synchronization interrupt signal, which then passes through a computer bus-bar interface to trigger the interrupt controller 53 (interrupt system) in the computer. According to the interrupt request, CPU 11 will transfer the program-execution control from the application program 56 to the vertical synchronization interrupt program 55; through the RS 232 interface 52, the vertical synchronization interrupt program 55 will provide an output of shutter switching signal (via DTR or RTS pin) to the external shutter synchronizer with RS 232 interface 30. By means of such signal, the external shutter synchronizer with RS 232 interface 30 will trigger the LCD shutter driver 32 to generate an output of LCD shutter driving signal to drive the LCD shutter so as to enable the LCD shutter 42 switching synchronously with the display of the left and right images. Since the switching of the LCD shutter 42 and the display of the left and right images are taking place synchronously by means of a hardware interrupt controller 53 (interrupt system) to perform such operation, it is referred to as a hardware type of synchronization.

Figure 4:
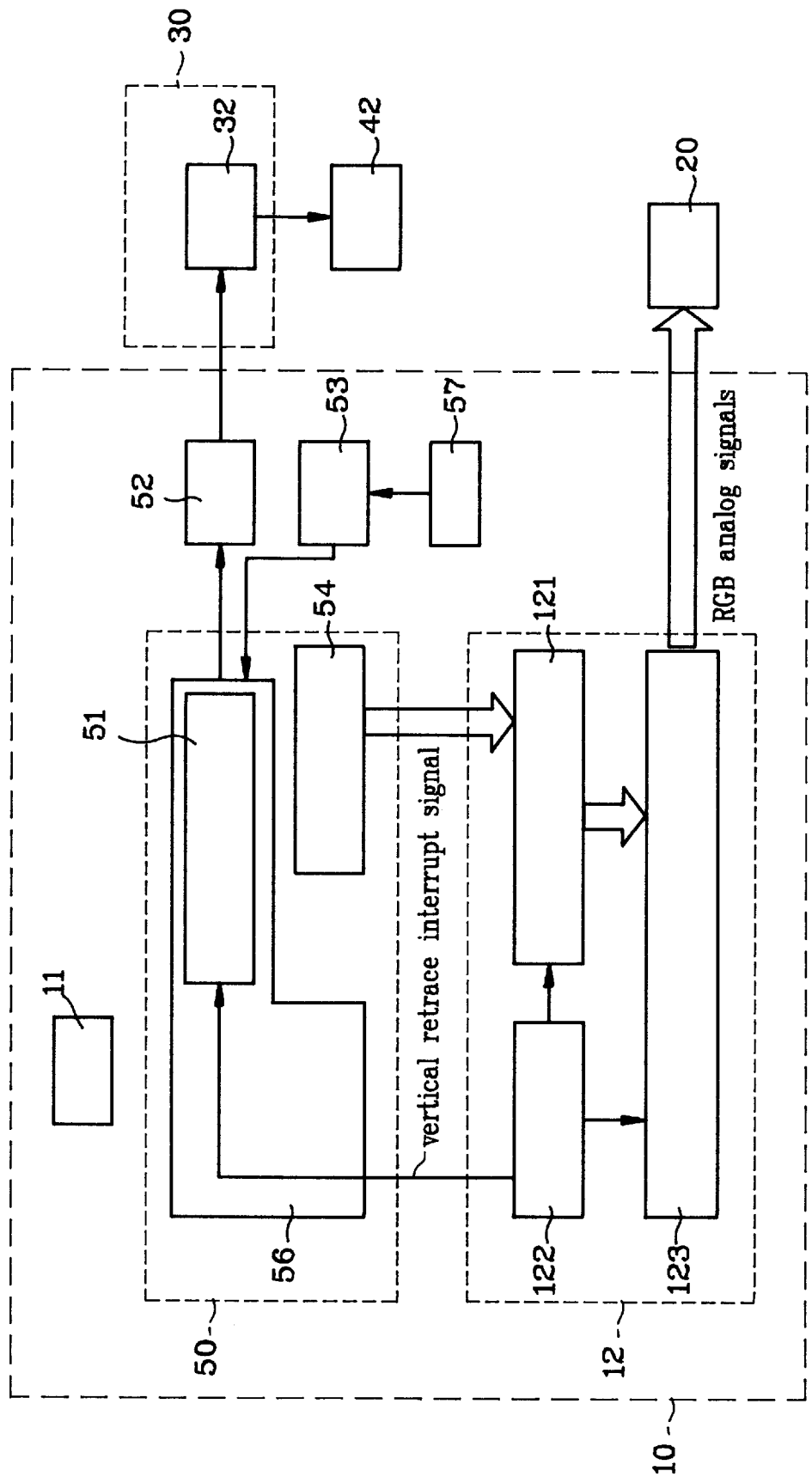
FIG. 4 is a block diagram of another hardware type of synchronization embodiment according to the present invention, showing the operation thereof.

Referring to FIG. 4, it is a block diagram of another hardware type of synchronization embodiment according to the present invention; it is different from the embodiment-1 by adding an interrupt controller 53 and a timer 57; further, the application program 56 is added with a vertical retrace blanking program 51; the techniques for transmission and display of the left and right image data are the same as the embodiment-1, and therefore no description therefor are given. According to the embodiment, a computer timer 57 uses a frequency being approximately and synchronously to a vertical synchronization scanning signal of VGA drawing card to generate constantly an output signal sent to the interrupt controller 53 for generating a interrupt signal constantly. According to the interrupt request, the CPU 11 will transfer the program-execution control from the application program 56 to the vertical retrace interrupt program 51; then, the vertical retrace interrupt program 51 can detect the vertical retrace condition (the vertical retrace is to be provided by means of the controller 122 of the VGA drawing card 12). If the VGA scanning is under a vertical retrace condition, the vertical retrace interrupt program 51 will through the RS 232 interface 52, send out a shutter switching signal (via DTR or TRS pin) to the external shutter synchronizer with RS 232 interface 30, which will use such signal to trigger the LCD shutter driver 32 to send out a LCD shutter driving signal to actuate the LCD shutter 42 so as to have the[000c]CD shutter 42 switching and the display of the left and right images synchronized.

The power supply and input signal for the external shutter synchronizer with RS 232 interface 30 are to be furnished by the pin of the RS 232 interface 52; the electronic circuit thereof can be provided separately or included in the connectors of the RS 232 interface 52, or the circuit can also be furnished in the peripheral devices, such as a mouse controller, a control rod, or a keyboard. Further, the function of the RS 232 interface 52 can be replaced with an output interface of a printer for receiving a shutter switching signal from the main memory to send the signal to the external shutter synchronizer with RS 232 interface 30; simultaneously, a power supply can be provided for the external shutter synchronizer with RS 232 interface 30.

Figure 5:
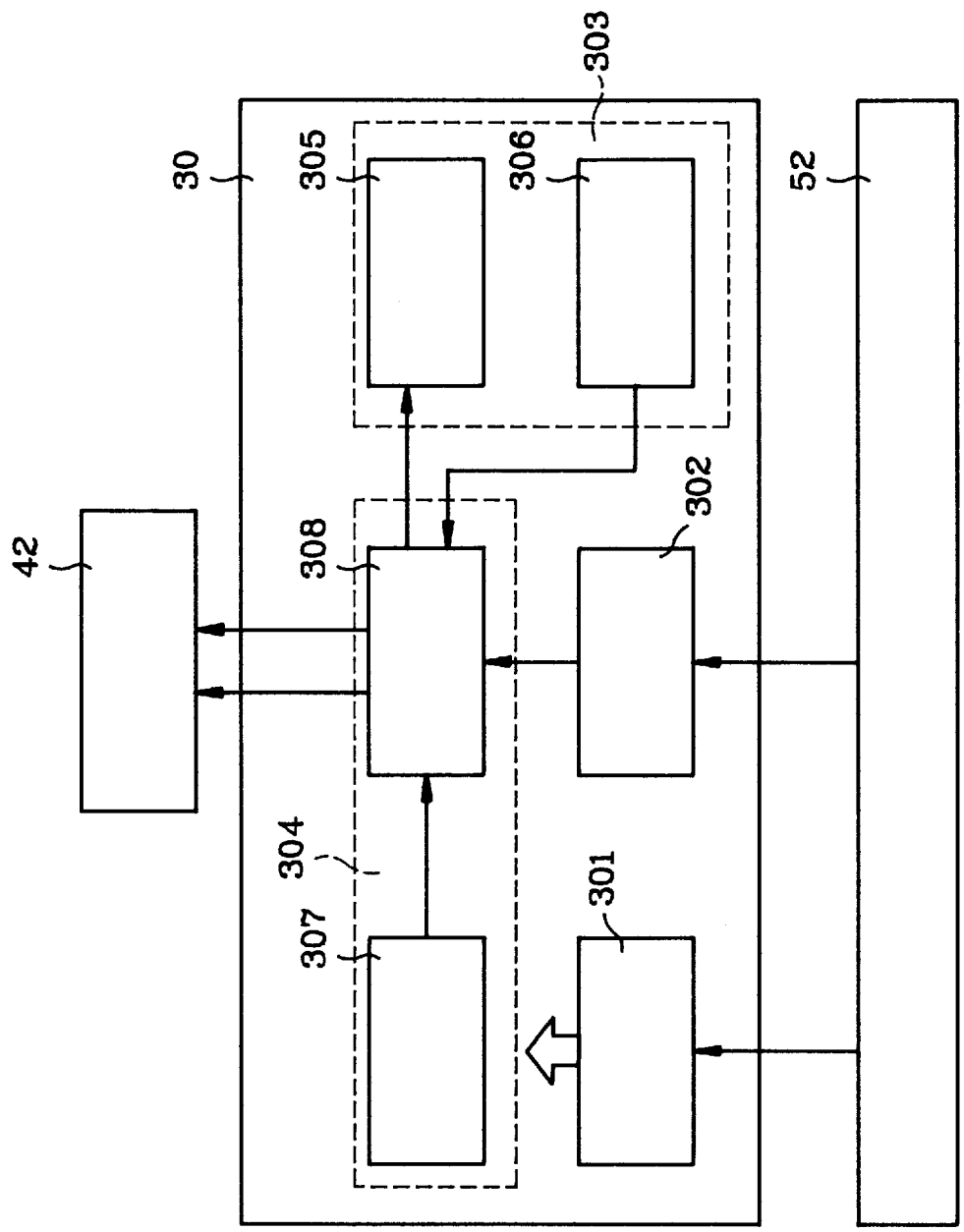
FIG. 5 is a block diagram of the present invention, showing an external shutter synchronizer with RS 232 interface.

Referring to FIG. 5, it illustrates a circuit block diagram of the external shutter synchronizer with RS 232 interface, and it includes a power supply 301, an interface RS 232 buffer 302, a shutter switch 303 and a shutter controller 304; if the DTR of the RS 232 interface is used for supplying power to the external shutter synchronizer with RS 232 interface 30, the pin RTS will provide the external shutter synchronizer with RS 232 interface 30 with a shutter switching signal, and vice versa. The power supply 301 of the external shutter synchronizer with RS 232 interface 30 includes a voltage stabilizer and filter circuit, of which the function is to provide an output out of the DTR of the RS 232 interface for supplying a D.C., power for the external shutter synchronizer with RS 232 interface 30. The RS 232 interface buffer 302 is used for isolating the RS 232 interface 52 from the external shutter synchronizer with RS 232 interface 30 so as to prevent from interference, i.e., the shutter switching signal out of the pin RTS of the RS 232 interface 52 would not have distortion as a result of the existence of the external shutter synchronizer with RS 232 interface 30; therefore, the RS 232 interface buffer 302 will send a signal to the shutter controller 304. The shutter switch 303 includes a shutter manual switch 306 and a shutter condition indicator 305, and the function thereof is to enable or disable the output of a LCD shutter driving signal manually; if an enable function is required, the shutter manual switch 306 will send out an "enable" signal to the shutter controller 304; if a disable function is required, the shutter manual switch 306 will send out a "disable" signal to the shutter controller 304 have an output of a LCD shutter driving signal or not in accordance with an enable or disable signal; finally, the shutter controller 304 will send an enable or disable signal to the shutter condition indicator 305, and then a user can know, through the shutter condition indicator 305, the using condition of the shutter eye-glasses. The shutter controller 304 includes a LCD shutter driving signal generator 307 and a control circuit 308; the prime function of the shutter controller 304 is to receive a shutter switching signal out of the RS 232 interface buffer 302; then, the shutter switching signal is used to trigger the left and right LCD shutters; simultaneously, the shutter controller 304 also sends out a driving signal so as to have the switching of the left and right LCD shutter become synchronized with the display of the left and right images. By means of the enable/disable signals out of the shutter switch 303, the LCD shutter can be determined whether it is to be driven or not.

Figure 6:
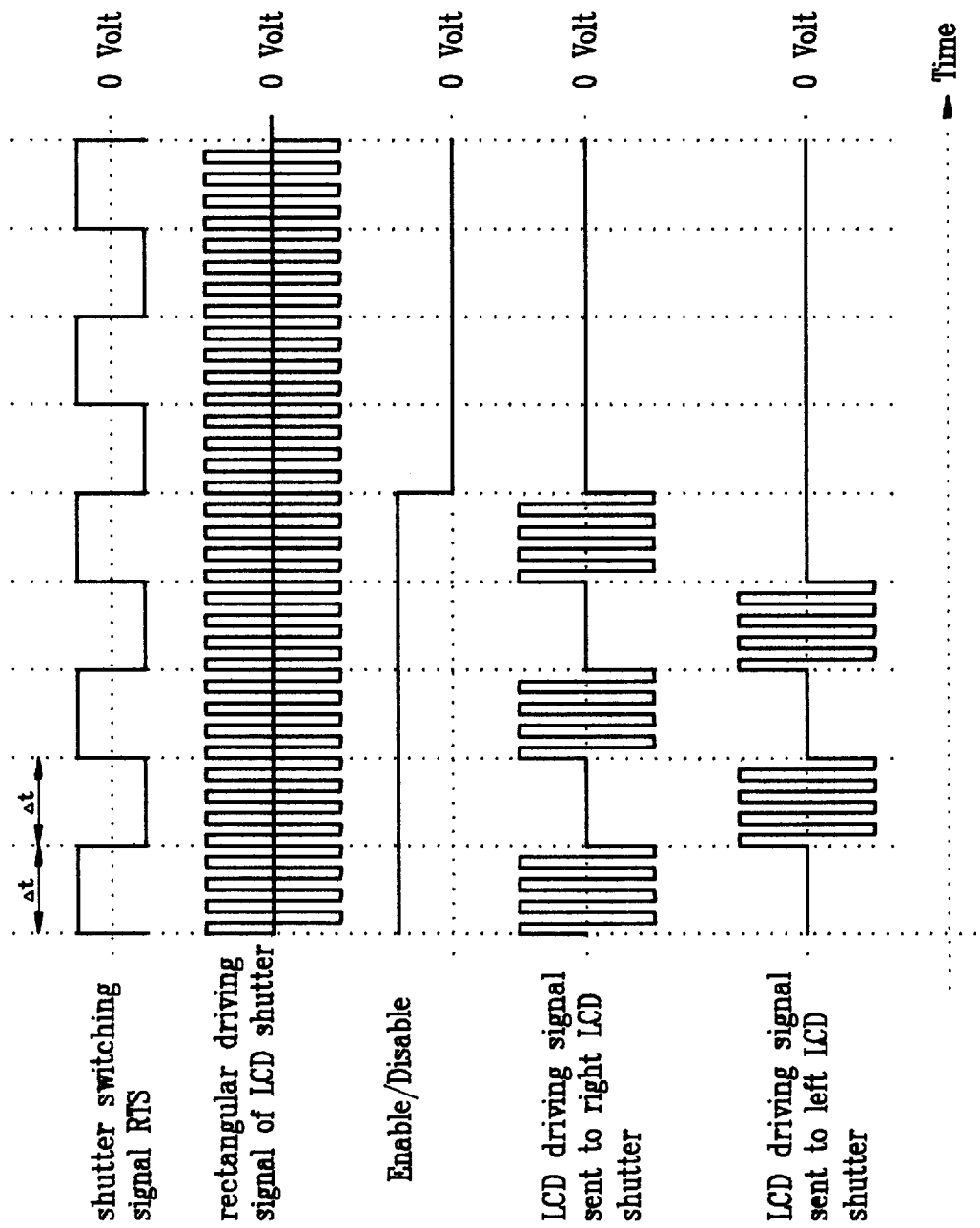
FIG. 6 is diagram, showing various input and output signals out of the external shutter synchronizer with RS 232 interface.

Referring to FIG. 6, it illustrates the various input and output signals of the external shutter synchronizer with interface RS 232; if the RTS sends out a shutter switching signal through the RS 232 interface buffer 302, and if the shutter switching signal is in high state, it indicates a period of time that the VGA displays the left image (Δt stands for the scanning time for a single image). When the shutter switching signal is in low state, it indicates a period of time that VGA displays the right image, and vice versa. When the driving voltage of the LCD shutter is at zero, it indicates the shutter being in a transparent state. When the driving voltage (the rectangular driving signal of LCD shutter) is activated, it indicates the shutter being in shutoff state, and vice versa. Moreover, the rectangular driving signal of LCD shutter out of the LCD shutter driving signal generator 307 and the enable/disable signal out of LCD shutter generated are sent to the control circuit 308 respectively. If the LCD shutter signal is in "enable" state, and the shutter switching signal is in high state, the control circuit 308 will send a LCD driving signal to the right LCD shutter so as to have the right LCD shutter set in shutoff state, while the zero voltage will be sent to the left LCD shutter, and the left LCD shutter will be set in transparent state; therefore, a user wearing the LCD shutter eye-glasses can only see the left image through the left eye, while the right eye sees nothing. Likewise, if the LCD shutter signal is in "enable" state, and the shutter-switching signal is in low state, the control circuit 308 will send a LCD driving signal to the left LCD shutter so as to have the left LCD shutter set in shutoff state, while the zero voltage will be sent to the right LCD shutter, and the right LCD shutter will be set in transparent state; therefore, a user wearing the LCD shutter eye-glasses can only see the right image through the right eye, while the left eye sees nothing. If it is in "disable" state, the control circuit 308 will send a zero voltage to the left and right shutters simultaneously so as to have the left and right LCD shutters all set in transparent state. Therefore, a user wearing the LCD shutter eye-glasses can see the left and right images through two eyes, i.e., it is similar to a condition of not wearing LCD shutter eyeglasses, and the LCD shutter eye-glasses have no effect to user's sight.

In brief, the present invention can have the switching of the LCD shutter of the LCD shutter eye-glasses synchronized with the display of the left and right images by using an external shutter synchronizer with RS 232 interface designed with a simple circuit and using a software program together with a hardware device. The present invention not only can overcome the problems of a conventional complicated circuit and inconvenience of use thereof, but also can change the position of circuit of the external shutter synchronizer with RS 232 interface, if necessary; therefore, it can reduce the manufacturing cost, and can provide more convenience during use so as to have more economical features.

I claim:

1. A stereoscopic system with a shutter synchronization circuit to allow a LCD shutter switching to be synchronized with a vertical synchronization scanning signal of a VGA graphic card, said system comprising:

a main memory used for storing a three-dimensional application software, a vertical retrace detecting program, a vertical synchronization interrupt program, and a vertical retrace interrupt program; and output data which comprises a stereoscopic left and right image data signal and a shutter-switching signal;

a VGA graphic card for receiving the output image data from said main memory; after said image data being processed, said VGA graphic card sending out a RGB analog electric signal;

a monitor for receiving said RGB analog electric image signal from said VGA graphic card;

a RS 232 interface for receiving a shutter-switching signal out of said main memory, and then sending out said shutter-switching signal;

an external shutter synchronizer for receiving said shutter switching signal from said RS 232 interface; and said external shutter synchronizer being triggered by said shutter switching signal to send out left and right LCD shutter driving signals so as to drive a pair of left and right LCD shutters respectively, and thus cause said left and right LCD shutter switching to become synchronized with a display of a left and right image scanning;

wherein said external shutter synchronizer further comprises:

(1) a power supply for supplying power provided by said RS 232 interface, to said external shutter synchronizer after being processed through a voltage stabilizer and filter;

a RS 232 interface buffer used for receiving a shutter-switching signal from said RS 232 interface, and for isolating a shutter switching signal out of a pin of said RS 232 interface to prevent said signal from distortion as a result of said external shutter synchronizer;

(3) a shutter switch being operated manually to enable or disable a LCD shutter driving signal to be send out; and send out an enable or disable signal;

(4) a shutter controller used for receiving output signals from said RS 232 interface buffer and said shutter switch, said two signals being used to trigger and send out a left or a right LCD shutter driving signal.

2. The stereoscopic system as claimed in claim 1, wherein said circuit further comprises an interrupt controller for receiving a vertical synchronization interrupt signal from said VGA graphic card, and also sending out an interrupt request signal to said main memory so as to transmit signal continuously.

3. The stereoscopic system as claimed in claim 1, wherein said circuit further comprises a timer and an interrupt controller; said timer constantly sending out a signal to said interrupt controller to generate an interrupt signal; said interrupt controller also sending a signal to said main memory for transmitting signal continuously.

4. The stereoscopic system as claimed in claim 3, wherein said timer generates an output signal constantly by means of a frequency being approximate and synchronous to a vertical synchronization scanning signal of VGA graphic card.

5. The stereoscopic system as claimed in claim 1, wherein said external shutter synchronizer further includes:

(1) a shutter manual switch used for controlling output or not of a LCD shutter signal; and said controlling signal for output or not being sent to said shutter controller;

(2) a shutter condition indicator used for indicating using condition of a stereoscopic eye-glasses in accordance with an output signal of said shutter manual switch.

6. The stereoscopic system as claimed in claim 1, wherein said shutter controller includes:

(1) a LCD shutter driving signal generator used for generating a rectangular signal to drive a LCD shutter, and also sending out said rectangular signal;

(2) a control circuit used for receiving signals out of said LCD shutter driving signal generator, RS 232 interface buffer and said shutter switch, and according to said signals out of said RS 232 interface buffer and said shutter switch to determines whether a left or a right LCD shutter signal being sent out or not.

7. The stereoscopic system as claimed in claim 1, wherein the function of said RS 232 interface can be replaced with an output interface of a printer to receive a shutter switching signal out of said main memory, and then said switching signal being sent to said external shutter synchronizer with RS 232 interface; simultaneously providing said external shutter synchronizer with RS 232 interface with power supply.

* * * * *